May 16, 1950 A. E. HARRISON 2,507,712

COUPLING BETWEEN BALANCED AND UNBALANCED CIRCUITS

Filed April 2, 1948 2 Sheets-Sheet 1

INVENTOR.
ARTHUR E. HARRISON
BY G. H. Stevenson
ATTORNEY

COUPLING BETWEEN BALANCED AND UNBALANCED CIRCUITS

Filed April 2, 1948 2 Sheets-Sheet 2

INVENTOR.
ARTHUR E. HARRISON
BY G. H. Stevenson
ATTORNEY

Patented May 16, 1950

2,507,712

UNITED STATES PATENT OFFICE 2,507,712

COUPLING BETWEEN BALANCED AND UNBALANCED CIRCUITS

Arthur E. Harrison, Short Hills, N. J., assignor to Bell Telephone Laboratories, Incorporated, New York, N. Y., a corporation of New York Application April 2, 1948, Serial No. 18,516

11 Claims. (Cl. 178—44)

This invention relates to electric wave transmission systems and, more particularly, to coupling devices for high frequency signaling systems.

In high frequency systems, difficulties are often encountered in designing coupling devices for coupling balanced and unbalanced circuits. These difficulties are for the most part caused by stray capacitances which have a tendency to disturb the relationship between the conductors of both circuits as well as between the conductors of the balanced circuit and ground, thus permitting the flow of undesired and unpredictable currents, and introducing voltage loops whereby further insulation problems are created. Various circuit arrangements have been proposed heretofore for eliminating or minimizing these stray capacitances, said arrangements, however, involving in most instances complicated or bulky structures.

An object of this invention is to provide a circuit arrangement comprising coupled balanced and unbalanced circuits in which the effects of stray capacitances are largely eliminated.

Another object of the invention is to provide a relatively inexpensive coupling device for coupling balanced and unbalanced circuits, said device being adapted to minimize the flow of stray currents and to prevent the formation of undesirable voltage loops.

A further object of the invention is to provide a coupling arrangement of low bulk, to be used particularly in mobile high frequency transmitters or receivers.

Still another object of the invention is to provide means for at least partly resonating the inductance of a loop forming the coupling between a balanced and an unbalanced circuit, said means also serving to diminish the flow of parasitic currents through the coupling and the two circuits.

The manner in which these and other objects and features of the invention are attained will be described in connection with the following detailed description of the invention taken in conjunction with the accompanying drawing in which.

Figure 1:
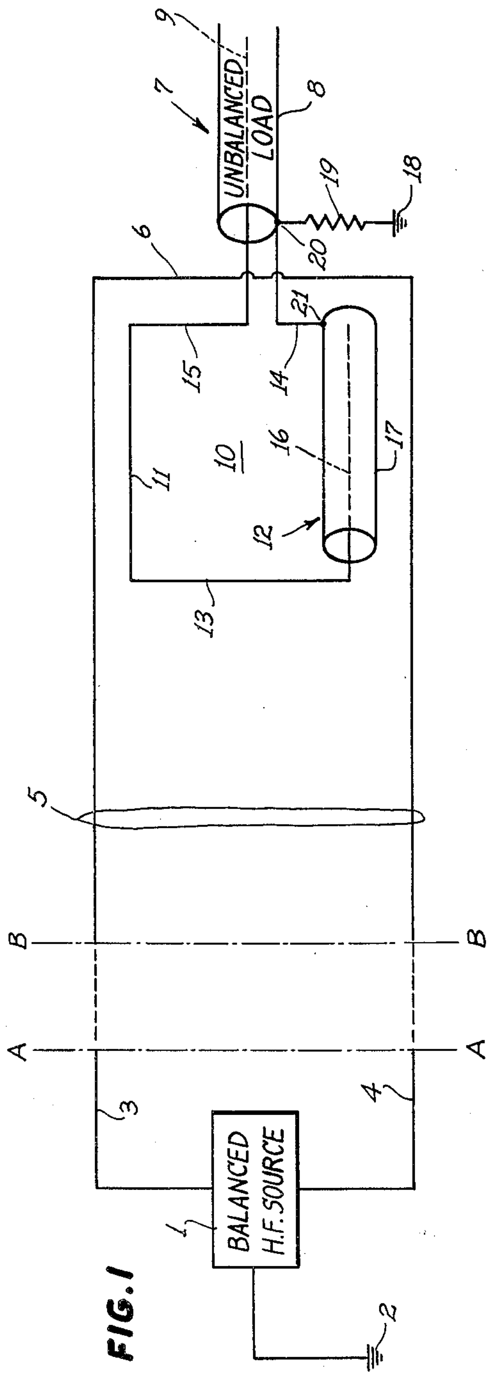
Fig. 1 is a schematic circuit diagram showing a coupling arrangement according to the invention.

In Fig. 1 there is shown a balanced source 1 of high frequency currents, grounded at the center as is indicated at 2. Source 1 may be a push-pull amplifier and is connected across the conductors 3, 4 of a balanced Lecher wire transmission line 5, an indeterminate length of this line, extending between the lines A—A and B—B. The far end of this Lecher wire line 5 is short-circuited by a conductor 6.

An unbalanced load, shown as a coaxial transmission line or cable 7 having an outer conductor 8 and an inner conductor 9, is inductively coupled to the line 5 by means of a loop 10. Preferably, the linear extent of loop 10 is of the order of not more than ten electrical degrees in the line at the operating frequency of source 1. The loop 10 comprises a first conductor 11 which is adjacent to conductor 3 and parallel thereto, a coupling device 12 which is adjacent to and parallel to conductor 4, a transverse conductor 13, and a pair of conductors 14 and 15 which are connected, respectively, to conductors 8 and 9 of the unbalanced cable 7. Device 12 comprises an inner conductor element 16 and an outer tubular conductor element 17 coaxially surrounding the element 16, the two elements being insulated from one another for example in the manner subsequently described with reference to Fig. 5.

The outer conductor 8 of the cable 7 is grounded at 18, as is customary, yet an appreciable impedance 19 will be found to exist between the input 20 of the cable and actual ground, in view of the high frequencies employed. The impedance 19 may be resistive, inductive, or capacitive, its magnitude and phase angle depending on the physical arrangement of the parts.

The capacitance existing between the conductor elements 16 and 17 of the device 12 will complete the circuit for high frequency currents induced in the loop 10 by the currents flowing in conductors 3 and 4 of the balanced line 5. At the same time, this capacitance will at least partly resonate the inductance of the loop 10, thereby reducing the impedance thereof and increasing the efficiency of the coupling arrangement.

It will be understood that, at the frequencies contemplated, stray currents will also tend to flow across the distributed capacitances existing between conductors 4 and 17 on one hand and between conductors 3 and 11 on the other. Current passing in this manner from conductor 4 to the sheath 17 will divide at point 21 where the sheath is connected to conductor 14, part of the current flowing through conductor 14 and part through conductor 16, the latter current returning to the source 1 by way of the aforesaid capacitance between conductors 11 and 3. The current passing through conductor 14 will again divide at point 20, part going through the load and returning by way of conductors 9, 15 and 11, the other part flowing to ground through the impedance 19.

That part of the stray current which, branching off at or near point 21, flows through conductors 16 and 11 must first pass along the inside of the tubular sheath 17 before reaching inner conductor element 16 across the interelement capacitance of the device 12. Thus it will be seen that the path of this current is substantially longer than it would be if device 12 were replaced by a single conductor and that, furthermore, the said interelement capacitance introduces an additional impedance into this path whereby the magnitude of this undesirable current will be decreased. At the same time it can be shown that this capacitance also tends to improve the phase angle of the stray current, with respect to the induced current, in such a manner that the former will no longer oppose, but will, at least to a certain extent, reinforce the latter whereby the efficiency of the coupling arrangement will be further enhanced.

Figure 2:
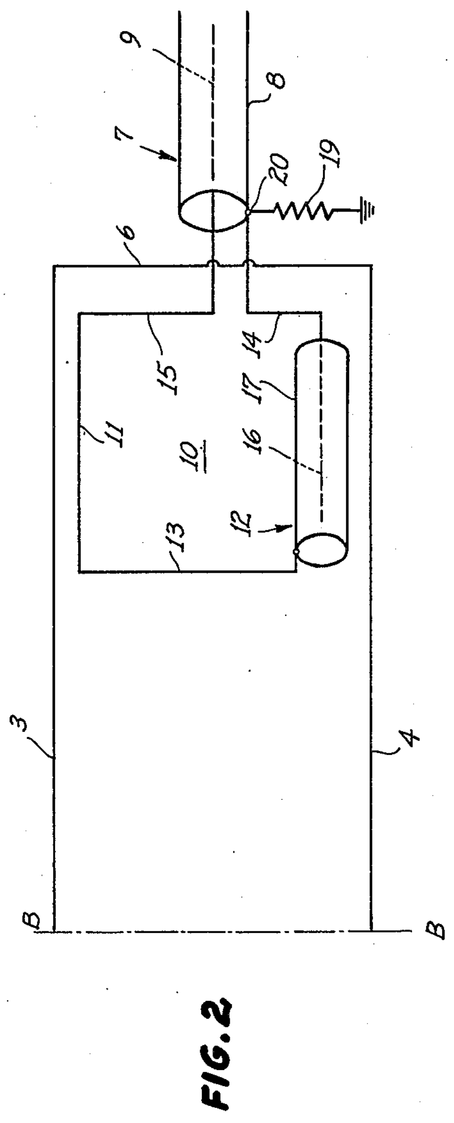
Figs. 2, 3 and 4 are similar diagrams showing modifications of the coupling arrangement illustrated in Fig. 1.

The arrangement shown in Fig. 2 differs from that just described in that, in this case, the sheath 17 of the device 12 is connected to transverse loop conductor 13 while the inner conductor element 16 is connected to grounded conductor 14. It will be seen that the interelement capacitance of device 12 is here inserted in the path of that part of the stray current which flows toward point 20. Most of the stray current power passing through conductor 13 will, however, again have to pass along the inner surface of sheath 17, thus following a path of increased length.

Figure 3:
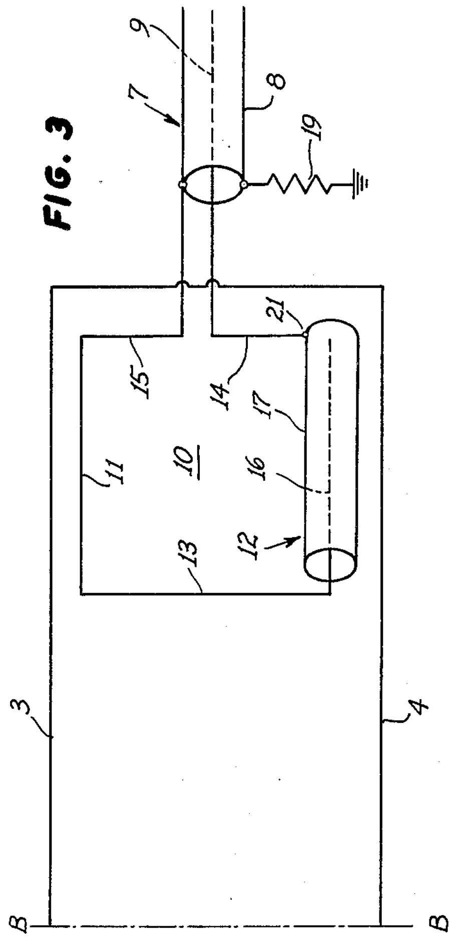

The modification shown in Fig. 3 is similar to that illustrated in Fig. 1, except that conductor 14 now connects the point 21 on sheath 17 with the center conductor 9 of the unbalanced load 7, the outer grounded load conductor 8 being here connected to conductor 15 of the loop 10. With this arrangement, the stray path to ground for energy from balanced line 5 leads over the capacitance between conductors 3 and 11 which, normally, will be less than the capacitance between conductor 4 and sheath 17 so that the magnitude of this parasitic current will be reduced.

Figure 4:
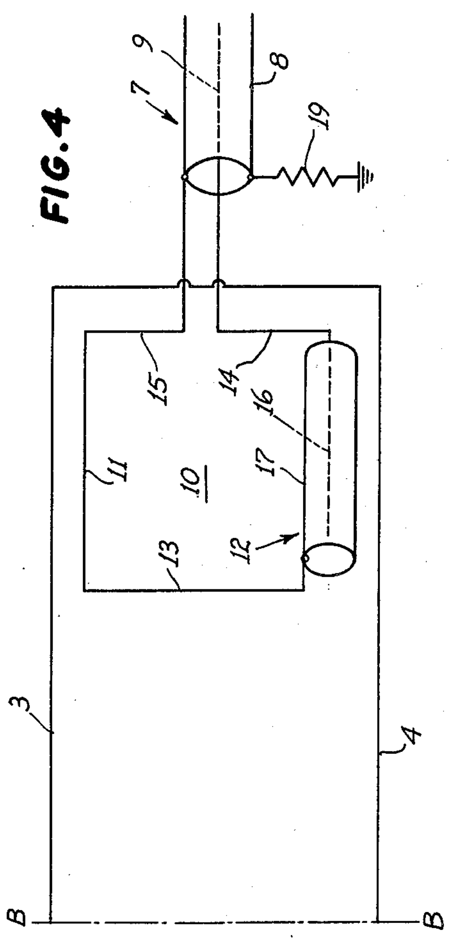

The modification shown in Fig. 4 combines some of the features of the modifications shown in Figs. 2 and 3 in that the sheath 17 is connected by way of loop conductors 13, 11 and 15 to the cable sheath 8, inner conductor 16 being now connected to the central cable conductor 9 by way of loop conductor 14. The functioning of this arrangement will be clear from the foregoing description.

Figure 5:
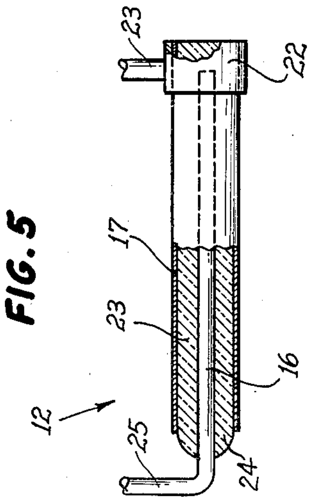
Fig. 5 is a detailed view of a coupling device according to the invention, as used in the circuit arrangements of the preceding figures.

As shown in Fig. 5, the tubular conductor 17 of the device 12 preferably consists of a metallic shell conductively surrounded by a metallic ring 22, the latter being joined to a portion 23 of a conductor which may be the element 14 or 13 in Fig. 1 or 2, respectively. Inner conductor 16 is held in spaced relation relative to shell 17 by means of a tubular body 24 of insulating material which, as shown, projects beyond the end of conductor 16 at the right and beyond the end of conductor 17 at the left. The conductive member 16 is integral with a conductor portion 25 which may represent part of element 13 or 14 in Fig. 1 or 2, respectively.

Although the invention has been described and illustrated with reference to certain specific embodiments, it is to be understood that various modifications and adaptations thereof will be within reach of those skilled in the art and may be resorted to without departing from the spirit or exceeding the scope of the invention as defined in the objects and in the appended claims.

What is claimed is:

1. A device for coupling a pair of balanced and a pair of unbalanced conductors, comprising a conductive loop having two galvanically separated branches, a metallic sheath conductively connected to one of said branches, said sheath insulatedly surrounding a portion of the other branch of said loop, another portion of said loop extending adjacent one of said balanced conductors in spaced relation thereto, said sheath extending adjacent the other of said balanced conductors in spaced relation thereto, and means connecting each of said branches to a respective one of said unbalanced conductors.

2. A device according to claim 1 wherein said sheath is grounded.

3. A device according to claim 1 wherein the portion of the loop surrounded by said sheath is grounded.

4. A coupling between an unbalanced and a balanced circuit, comprising a conductive loop having two substantially parallel portions and a transverse portion connected across respective ends thereof, one of said parallel portions comprising a linear element and a tubular element insulatedly surrounding said linear element in spaced coaxial relation thereto, one of said elements being conductively connected to said transverse portion, means conductively connecting the end of the other of said elements remote from said transverse portion to a conductor of said unbalanced circuit, and means conductively connecting the end of the other of said parallel portions remote from said transverse portion to another conductor of said unbalanced circuit.

5. A coupling according to claim 4 wherein said remote end of the other of said elements is grounded.

6. An electrical transmission system comprising an unbalanced and a balanced circuit, a source of high frequency energy connected in one of said circuits, a load connected in the other of said circuits, and means electromagnetically coupling said two circuits, said means including a loop having two substantially parallel portions and a transverse portion connected across respective ends thereof, one of said parallel portions comprising a linear element and a tubular element insulatedly surrounding said linear element in spaced coaxial relation thereto, one of said elements being conductively connected to said transverse portion, means conductively connecting the end of the other of said elements remote from said transverse portion to a conductor of said unbalanced circuit, and means conductively connecting the end of the other of said parallel portions remote from said transverse portion to another conductor of said unbalanced circuit.

7. A system according to claim 6 wherein the physical extent of each of said portions is small relative to the wavelength of said high frequency source.

8. A system according to claim 6 wherein said high frequency source is connected in the balanced circuit.

9. In a high frequency electric wave transmission system having a driving circuit including a Lecher wire transmission line having two conductors and a driven circuit comprising a first coaxial transmission line having an inner conductor and an outer conductor coaxial with said inner conductor, one of said circuits being balanced and the other unbalanced, coupling means for coupling said circuits, said coupling means comprising a single turn coupling loop including a second coaxial line, one portion of said coupling loop being adjacent to one of said Lecher wire conductors and another portion of said coupling loop including said second coaxial line being adjacent to the other of said Lecher wire conductors, said second coaxial line having an inner conductor conductively connected by a portion of said coupling loop to one of the conductors of said first coaxial line, said second coaxial line also having an outer conductor coaxial with the inner conductor of said second coaxial line and conductively connected by another portion of said coupling loop to the other conductor of said first coaxial line, and said second coaxial line also having insulating means for electrically insulating its inner conductor from its outer conductor.

10. A high frequency electric wave transmission system in accordance with claim 9, wherein the inner conductor of the second coaxial line is conductively connected by a portion of the coupling loop to the inner conductor of the first coaxial line and wherein the outer conductor of the second coaxial line is conductively connected by another portion of said coupling loop to the outer conductor of the first coaxial line.

11. A high frequency electric wave transmission system in accordance with claim 9 wherein the inner conductor of the second coaxial line is conductively connected by a portion of the coupling loop to the outer conductor of the first coaxial line and wherein the outer conductor of the second coaxial line is conductively connected by another portion of said coupling loop to the inner conductor of the first coaxial line.

ARTHUR E. HARRISON.

REFERENCES CITED

The following references are of record in the file of this patent:

UNITED STATES PATENTS

| Number | Name | Date |
|---|---|---|
| 2,272,731 | Swart | Feb. 10, 1942 |